(12) United States Patent
Taniuchi

(10) Patent No.: US 9,789,704 B2
(45) Date of Patent: Oct. 17, 2017

(54) METHOD FOR MANUFACTURING A PATTERN, MANUFACTURING APPARATUS FOR MANUFACTURING A PATTERN, METHOD FOR MANUFACTURING STRUCTURAL BODY AND MANUFACTURING APPARATUS THEREFOR

(71) Applicant: CANON KABUSHIKI KAISHA, Tokyo (JP)

(72) Inventor: Hiroshi Taniuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 14/574,193

(22) Filed: Dec. 17, 2014

(65) Prior Publication Data

US 2015/0165739 A1 Jun. 18, 2015

(30) Foreign Application Priority Data

Dec. 18, 2013 (JP) .................................. 2013-261519

(51) Int. Cl.
*B05D 1/36* (2006.01)
*B32B 37/24* (2006.01)
*B32B 38/10* (2006.01)
*C09D 11/54* (2014.01)
(Continued)

(52) U.S. Cl.
CPC ............ *B41J 11/0015* (2013.01); *B05D 1/36* (2013.01); *B05D 5/00* (2013.01); *B29C 67/0081* (2013.01); *B32B 37/025* (2013.01); *B32B 37/1292* (2013.01); *B32B 37/24* (2013.01); *B32B 38/10* (2013.01); *B33Y 10/00* (2014.12); *B33Y 30/00* (2014.12); *B41J 2/0057* (2013.01); *B41J 2/01* (2013.01); *B41J 2/14* (2013.01);
(Continued)

(58) Field of Classification Search
CPC ...... B05D 1/36; B05D 3/002; B29C 67/0051; B29C 67/0074; B29C 67/0077; B29C 67/0081; B32B 37/025; B32B 37/1284; B32B 37/1292; B32B 37/24; B32B 2037/243; B32B 38/10; B33Y 10/00; B33Y 30/00; B33Y 40/00; B41J 2/0057; B41J 2/01; B41J 2/2114; B41J 2002/012; B41J 3/407; B41J 11/0015; C09D 11/54; B41M 5/0017; B41M 5/0041; B41M 5/0047; B41M 5/025; B41M 5/0256
See application file for complete search history.

(56) References Cited

U.S. PATENT DOCUMENTS

| 4,640,878 A | * | 2/1987 | Evans | ..................... | G03C 11/12 |
| | | | | | 430/14 |
| 5,624,484 A | * | 4/1997 | Takahashi | .............. | C09D 11/30 |
| | | | | | 106/31.75 |

(Continued)

FOREIGN PATENT DOCUMENTS

| CN | 1990241 A | 7/2007 |
| CN | 101421110 A | 4/2009 |

(Continued)

*Primary Examiner* — Michael Tolin
(74) *Attorney, Agent, or Firm* — Canon U.S.A. Inc., IP Division

(57) ABSTRACT

A method of manufacturing a pattern includes providing a pattern of a first liquid on a medium, applying a powder material to the provided pattern, and providing a second liquid to the powder material applied to the first liquid.

12 Claims, 2 Drawing Sheets

(51) Int. Cl.
| | |
|---|---|
| B41J 11/00 | (2006.01) |
| B32B 37/00 | (2006.01) |
| B05D 5/00 | (2006.01) |
| B29C 67/00 | (2017.01) |
| B33Y 30/00 | (2015.01) |
| B41J 2/005 | (2006.01) |
| B33Y 10/00 | (2015.01) |
| B32B 37/12 | (2006.01) |
| B41M 5/00 | (2006.01) |
| B41J 2/01 | (2006.01) |
| B41J 2/21 | (2006.01) |
| C09D 11/322 | (2014.01) |
| C09D 11/40 | (2014.01) |
| B41J 2/14 | (2006.01) |

(52) U.S. Cl.
CPC .......... *B41J 2/2114* (2013.01); *B41M 5/0017* (2013.01); *B41M 5/0047* (2013.01); *C09D 11/322* (2013.01); *C09D 11/40* (2013.01); *C09D 11/54* (2013.01); *B32B 2037/243* (2013.01); *B41J 2002/012* (2013.01)

(56) References Cited

U.S. PATENT DOCUMENTS

| | | | | |
|---|---|---|---|---|
| 6,896,839 | B2* | 5/2005 | Kubo | B29C 67/0077 264/109 |
| 6,991,329 | B2* | 1/2006 | Gore | B41J 11/002 347/105 |
| 2002/0105114 | A1 | 8/2002 | Kubo | |
| 2004/0094260 | A1* | 5/2004 | Summerfield | B41M 3/12 156/230 |
| 2013/0075022 | A1* | 3/2013 | Chillscyzn | B29C 67/0074 156/230 |
| 2013/0076843 | A1 | 3/2013 | Tombs | |
| 2013/0171431 | A1* | 7/2013 | Swartz | B32B 37/1284 428/196 |
| 2014/0198168 | A1* | 7/2014 | Pervan | B41J 3/28 347/110 |

FOREIGN PATENT DOCUMENTS

| | | | |
|---|---|---|---|
| CN | 102717584 | A | 10/2012 |
| EP | 0876914 | A1 | 11/1998 |
| GB | 2289866 | A * | 12/1995 |
| JP | H10-45138 | A | 2/1998 |
| JP | 2002-321350 | A | 11/2002 |
| KR | 10-2012-0053954 | A | 5/2012 |
| RU | 2169222 | C2 | 6/2001 |
| RU | 2370378 | C1 | 10/2009 |
| WO | 86/05600 | A1 | 9/1986 |
| WO | 98/05504 | A1 | 2/1998 |
| WO | 2007/145378 | A | 12/2007 |
| WO | 2011/097677 | A1 | 8/2011 |
| WO | 2013/033273 | A2 | 3/2013 |

* cited by examiner

METHOD FOR MANUFACTURING A PATTERN, MANUFACTURING APPARATUS FOR MANUFACTURING A PATTERN, METHOD FOR MANUFACTURING STRUCTURAL BODY AND MANUFACTURING APPARATUS THEREFOR

BACKGROUND OF THE INVENTION

Field of the Invention

The present invention relates to a method for manufacturing a pattern, a manufacturing apparatus for manufacturing a pattern, a method for manufacturing a structural body and a manufacturing apparatus therefor.

Description of the Related Art

In recent years, digital print technology has become widespread. Because the digital print does not need a plate, it is easy to produce small quantity print jobs, and it is convenient for small quantity production on short notice. Digital print technology allows for the printing of general printed matter such as a photograph or magazine by analog print with approximately equal quality. However, problems for digital print technology remain with regard to thick film printing. There is the problem that the types of ink materials and recording media can be limited. There is much promise in the thick film printing, and thick film printing should allow for the printing of image information that is other than that of normal printing. Therefore, with the thick film printing, it is important to have many choices of materials that can be used, such as the ink to form a pattern, and recording media. For example, screen-printing technology as an analog thick film screen printing technology can form part of the print image thick film and raises design value, and can print electric circuits using conductivity ink. In contrast, a UV-IJ (ink-jet) method, which is known for digital print as a means for thick film screen printing, and the electronograph method, each limit the materials such as the ink that can be used to form a pattern. For example, the pattern formation materials are limited to photopolymers which an ink-jet method can eject if it is UV-IJ.

In thick film screen printing, it has been suggested to raise the degree of freedom of the material used for pattern formation. According to Japanese Patent Laid-Open No. 10-45138 a method for thick film screen printing using ink has been disclosed in which a thermoplastic resin is applied on printed ink before the ink is dried and the thermoplastic resin is heated to melt the thermoplastic resin.

However, as the ink for ink-jet is typically of low viscosity, and as the ink drop ejected by a nozzle is typically absorbed in a recording medium immediately to prevent beading, it is difficult to have powder materials fix on the ink. Furthermore, even if it is possible to have powder materials fix on the ink, a big limitation is that it may be possible to make a pattern only on a recording medium having good ink absorbency.

SUMMARY OF THE INVENTION

Accordingly, aspects of the present invention are directed to a method capable of manufacturing a pattern formed by powder on a medium, with high precision, that allows for pattern formation on a wide variety of different media.

In one aspect of the present invention, a method of manufacturing a pattern is provided that includes providing a pattern of a first liquid on a medium, applying a powder material to the provided pattern, and applying a second liquid to the powder material applied to the first liquid to form a colored pattern of the powder material.

According to further exemplary embodiments of the present invention, there is provided a manufacturing apparatus for manufacturing a pattern.

DESCRIPTION OF THE EMBODIMENTS

Various exemplary embodiments, features, and aspects of the invention will be described in detail below with reference to the drawings.

Figure 1:
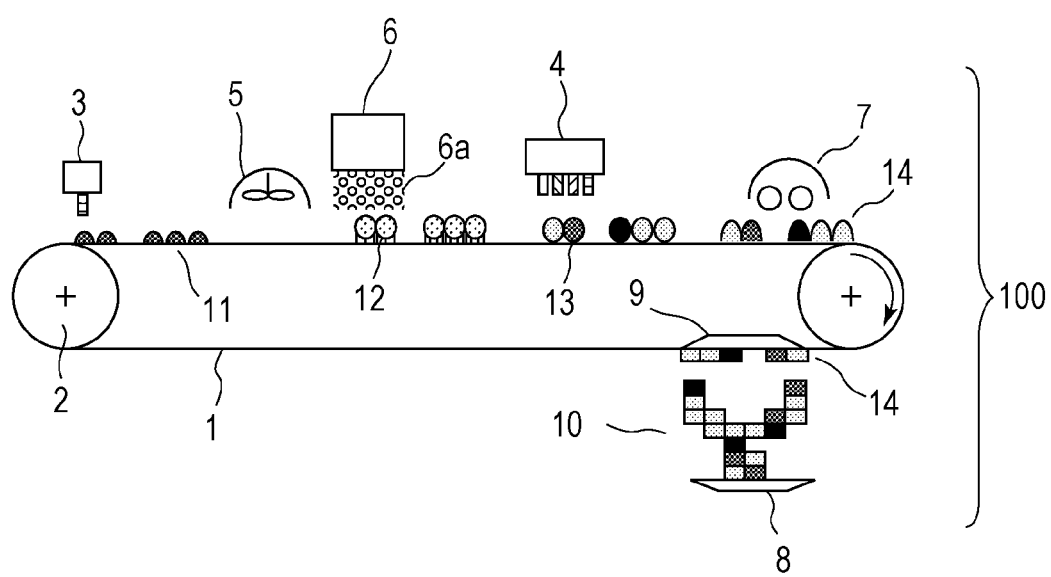
FIG. 1 is a schematic view showing a lamination modeling apparatus as one example of a manufacturing apparatus realizing a method for manufacturing a structural body according to an embodiment.
Figure 2:
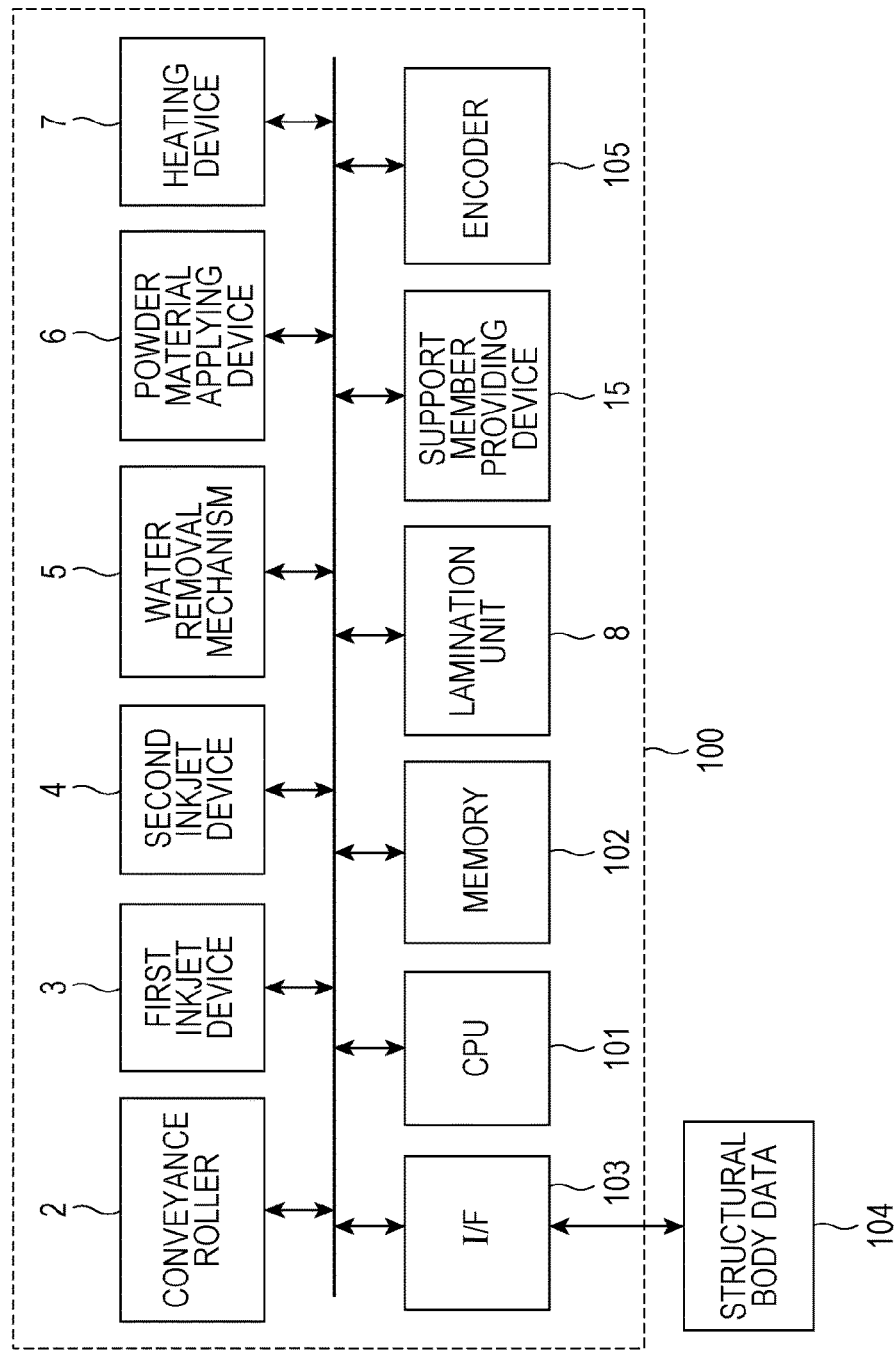
FIG. 2 is a block diagram showing a control system of the lamination modeling apparatus.

FIG. 1 is a perspective view schematically showing a lamination modeling apparatus 100 as one example of a manufacturing apparatus realizing the method for manufacturing a pattern and the method for manufacturing a structural body by the pattern according to the embodiment of the present invention. In the apparatus 100, a pattern of a layer of the structural body which is to be newly laminated is formed on a surface of a belt-shaped transfer member 1 functioning as a transfer member, and is then allowed to pass through each process unit by a transport mechanism 2, so that a colored pattern 14 as a cross-sectional layer having a cross-sectional shape of the structural body is formed. In addition, the colored pattern 14 for the structural body is transported to a lamination position of a lamination unit 8 which is reciprocally moved relatively to the transfer member 1 and is then laminated on a laminated in-process structural body 10. Here, the transfer member 1 is used for an intermediate printing medium.

The transfer member 1 functions as a support member supporting a layer of the structural body formed on the surface, and also functions as a transfer member transferring a formed layer to an in-process structural body which is already formed by laminating layers to each other. Hence, the transfer member 1 is may be formed of a material having a high release property while having an affinity to some extent to a material for forming the structural body. For example, it is possible to form a structural body even if only a part of cross-sectional layer at a side of the transfer member 1 is transferred. But, for the sake of precision of the structural body, it may be the case that the entire cross-sectional layer is transferred to the in-process structural body 10.

In addition, in order to stably perform the transfer, the transfer member 1 may have at least some elasticity. As a material for the transfer member, for example, a silicone rubber and a fluorinated rubber may be mentioned. Since a material used for patterning may be repelled in some cases on those rubber materials mentioned above, it may be the case that a surface treatment is performed thereon in accordance with the material to be used. Although the rubber hardness is determined depending on the thickness of an elastic body, when the thickness thereof is large, a hard rubber may be preferably used, and when the thickness is small, a soft rubber may be preferably used. When the thickness is large, a rubber having a hardness of approximately 80 degrees may be provided, and when the transfer member 1 has a thin belt shape, a thin film formed of a rubber having a thickness of approximately 0.1 to 0.5 mm and a rubber hardness of approximately 50 to 20 degrees may be provided. When a high accuracy is required, a TEFLON (registered trademark) sheet and a smooth film coated with a release agent having a submicron-order thickness, each of which has no elasticity, may be used. In a case where a transfer member 1 having less elasticity is used, since machine accuracy and/or a long process time may be required in some cases, the material may be selected in accordance with the application purpose.

In addition, when a metal powder or the like is used as the shape forming material, the surface thereof is may be processed by a release treatment using boron nitride or the like having a high heat resistance.

A laminating production process performed in the lamination modeling apparatus 100 are described below. In the apparatus shown in FIG. 1, reaction liquid as a first liquid is ejected from a first inkjet device 3 on a transfer member 1 to form a pattern 11 of the reaction liquid on the transfer member 1. However, the method is not limited to that described above, and for example, a pattern of the reaction liquid may also be formed by printing using plate, such as for example flexographic printing. If a plurality of patterns of different images or different colors is formed at the same time in same area, then printing using a plate may be efficient to some extent. Likewise, for forming a structural body, arranging a plurality of patterns each having different shapes on a plate and then laminating the plurality of patterns may form the structural body.

Because a patterning using inkjet method can form an intended pattern shape with a liquid, it may be preferable. Various types of inkjet methods, thermal type, piezo actuator type, electrostatic type, and continuous type, are usable. With respect to nozzle through which ink is ejected, at least one of a one nozzle type for example dispenser, and a line head provided with multi-nozzles, are usable. The line head may be preferably used for performing high productivity.

The first liquid is not limited to only the reaction liquid. A liquid such as for example a water-based ink, and/or an oil-based ink, can also be used as the first liquid. In the case of forming the pattern 11 by ejecting the first liquid on a print medium, it may be the case that the first liquid adhesiveness is kept until the powder materials arrive, so it may be the case that the water-based ink is used.

In case that plastic is used for the powder material and water-based ink is used for the first liquid, it may be the case that a water-soluble organic solvent and/or a surfactant is added into the water-based ink to let the water-based ink match with the plastic.

It may also be the case that water is evaporated from the applied ink as a first liquid comprising a water-soluble organic solvent and/or a surfactant to raise a density of the water-soluble organic solvent and/or a surfactant The water-soluble organic solvent used for the first liquid is not limited in particular. The water-soluble organic solvent may be selected with respect to surface tension, drying property, and viscosity, for example. As examples of the water-soluble organic solvent, for example, amides such as dimethylformamide and dimethylacetamide, ketones such as acetone, ethers such as tetrahydrofuran and dioxane, polyalkylene glycols such as polyethylene glycol and polypropylene glycol, alkylene glycols such as ethylene glycol, propylene glycol, butylenes glycol, triethylene glycol, 1,2, 6-hexanetriol, thidiglycol, hexylene glycol and diethylene glycol, lower alkyl ethers of multivalent alcohols such as ethylene glycol methyl ether, diethylene glycol monomethyl ether and triethylene glycol monomethyl ether, monovalent alcohols such as ethanol, isopropyl alcohol, n-butyl alcohol and isobutyl alcohol, glycerin, N-methyl-2-pyrilidone, 1,3-dimethyl-2-imidazolidinone, triethanolamine, sulfolane and dimethyl sulfoxide can be named.

As the surfactant, fluorine-based surfactants, silicone-based surfactants, water-soluble anionic surfactants, cationic surfactants, nonionic surfactants, and ampholytic surfactants can be used.

With respect to the first liquid, a reaction ink that reacts with a second liquid applied to the powder material after supplying the powder material, as described below, when contacting with second liquid to restrain the second liquid from moving may improve the quality of the image formed by the second liquid.

A reaction type and reaction material may be selected with regard to the combination to be made with the second liquid, and according to an object of using the reaction. For example, for a water-based ink, it is possible to use agglutination, salting out appearance reaction, and/or acid-base reaction, alone or in combination. In particular, the agglutination may be suitable. And in particular, a combination of pigment ink and reaction liquid including a metal salt may be provided with respect to image quality because that allows the formation of a thin ink pattern with a low amount of reaction liquid. And also, this combination may provide good because a reaction speed of this combination is high.

As a material for the reaction material contained in the reaction liquid, an ionic material having a charge that is the opposite of that of ink. For example, an anionic ink may be used as the ink for inkjet, and as reaction material for the anionic ink, a solution comprising a metal salt, in particular polyvalent metal salt solution having a valency of two or more, may be used. The polyvalent metal salt is consists of a polyvalent metal ion having a valency of two or more and anion corresponding to the polyvalent metal ion. As an example of the polyvalent metal ion, a divalent metal ion, such as for example $Ca^{2+}$, $Cu^{2+}$, $Ni^{2+}$, $Mg^{2+}$, $Zn^{2+}$ and trivalent metal ion, such as for example $Fe^{3+}$, $Al^{3+}$, can be named. And as example of the anion corresponding to that polyvalent metal ion, $Cl^-$, $NO^{3-}$, $SO_4^{2-}$, $I^-$, $Br^-$, $ClO^{3-}$, $RCOO^-$ (where R is a alkyl group) can be named.

It is useful to use the metal ion with acid for higher reactivity. The acid is also useful as the reaction material alone.

As examples of the acid, an organic acid, for example, oxalic acid, polyacrylic acid, formic acid, acetic acid, propionic acid, malonic acid, malic acid, maleic acid, ascorbic acid, succinic acid, glutaric acid, glutaminic acid, fumaric acid, citric acid, tartaric acid, lactic acid, pyrrolidone carboxylic acid, pyrone carboxylic acid, pyrrol carboxylic acid, furancarboxylic acid, coumaric acid, thiophencarboxylic acid, nicotinic acid, hydroxysuccinic acid, dioxysuccinic acid can be raised.

The first liquid may comprise a solid component, and a containing ratio in a colored pattern (described below) may be higher with decreasing solid component in the first liquid. The high containing ratio in the colored pattern effects hardness of the structural body formed by the colored pattern and makes recycling of the structural body easy.

In addition, because an amount of powder materials to be provided is in proportion to the thickness of the first liquid, with respect to the uniformity of the thickness of the layer to be formed by the powder, it may be the case that it is provided so that the thickness of the first liquid on transfer member 1 becomes uniform. The layer to be formed by the powder material having uniformity in the thickness contributes to aesthetically good features of the printed product formed by the layer, and also contributes to precision in forming the structural body formed by the layer.

Because the first liquid has a low effect on the image to be formed, because of the second liquid applied to the powder material, with respect to a color of the first liquid, it may be the case that it is provided so that the first liquid has transparency or no color. The color of the first liquid can be white.

To get uniform thickness for the layer to be formed by the powder material, the powder material may be selected according to a classification to a predetermined size. And in a range showing adhesive power, first liquid film may be thin.

In addition, a plurality of kinds of liquids may be used for the first liquid. In a case where ink jet method is used for applying the first liquid to the transfer member 1, materials contain two liquids and makes adhesiveness of the first liquid higher may be used. And also a water removal mechanism 5 in FIG. 1 can be used for adjusting the thickness of the first liquid.

Next, as shown in FIG. 1, the powder material applying device 6 applies the powder material 6a as a model forming material to a pattern of the first liquid transferred by the transfer member 1 to a position opposite to the powder material applying device. Thus, a pattern of the powder material 12 is formed. The powder material 6a is fixed by adhesiveness of the first liquid, so there are many choices to choose a material for the powder materials 6a. With respect to melting the applied powder material 6a to form a unified film, thermoplastic resin may be used for the powder material 6a preferably. As examples of the thermoplastic resin, polyethylene, polypropylene, nylon, ABS, polylactic acid, polystyrene, polychloro ethylene, polymethyl methacrylate, polytetrafluoroethylene, ionomer, EVA can be raised. Other than resin, materials that can be used for heating molten molding such as metal and glass, and a ceramic can be used. In addition, the powder material 6a with surface treatment for enhancing adhesion to the pattern of the first liquid 11 or fixation among the powder materials 6a may be used. With respect to the adhesion to the pattern of the first liquid 11 and removing the powder materials 6a which are applied to an area where the pattern of the first liquid 11 is not formed, a ball shaped powder material is preferable. Of course a shape of the powder materials 6a is not limited to that mentioned above. In order to provide powder materials 6a that line up neatly in a layer for forming the layer of constant film thickness, the particle size of each powder materials 6a are may be substantially equal. A larger size of each of the powder materials 6a may enable forming a layer of a thick film. Then again, powder materials 6a of a particle the inside of which is porous can make the formed layer have good color development when ink is applied to the layer.

The modeling material applying device 6 may blow the powder materials 6a to an area including a portion where the pattern 11 is formed, and remove the provided powder materials 6a which are not fixed by the pattern 11 of the first liquid by vibration, ventilation or absorption etc. Also, the powder materials 6a may flow and be applied to the area including the pattern 11 by the modeling material applying device 6. And also, It may be possible to form a pattern of powder materials 6a by static electricity, for example, and providing the pattern of powder materials 6a corresponding to the pattern 11 of the first liquid.

Applying the powder materials 6a and removing of the powder materials 6a can be executed by separated steps or simultaneously. For example, the powder material applying device 6 may send air to the pattern 11 of the first liquid and make the air carry the powder materials 6a to the pattern 11, and the flow of the air may remove powder materials 6a that are not fixed. By such a manner, forming a pattern of the powder materials 6a and removing of unnecessary powder can be done simultaneously.

In addition, a plurality of different kinds of powder materials can be used. A first kind of powder material can be applied to a first portion of the first liquid pattern to form a pattern of the first powder material, and subsequently a second kind of powder material can be applied to a second portion of the first liquid pattern to form a pattern of the second powder material. Such an above described method enables the arranging of the plurality of different kinds of powder materials in the same plane, and the forming of portions having different hardnesses from each other in formed layer.

Next, a second inkjet device 4 applies ink as the second liquid to the pattern of the powder material 12 so as to put a color on the pattern and then, a colored powder pattern 13 is formed. This method is useful because the second liquid is applied to the pattern of the powder material 12 without contacting to the pattern of the powder material 12. In particular, in a case that the colored powder pattern 13 is transferred to a structural body being constructed, it is preferable that the powder material 13 is not fixed on the transfer member 1 as strongly. And the ink jet method may prevent the powder material in the pattern of the powder material 12 from becoming trapped by the second inkjet device 4, and this method may be prefer than a contact print method in which a device for applying the second liquid contacts the pattern of the powder material 12.

Various types of ink jet methods are useful for the second inkjet device 4 as well as first inkjet device 3.

For the color ink as the second liquid, a water-based ink or oil-based ink may be used. The water-based ink may be used for causing a reaction between the first liquid and the second liquid. Ion reactions available for water-based ink perform very fast reaction, therefore this reaction may useful to form an image by the colored ink as the second liquid without disorder. In particular, a combination of pigment ink as the second liquid and a reaction liquid including a metal salt as the first liquid may be provided.

The pigment ink for the second liquid may contain pigment, and may also contain at least one of a dispersion resin, dispersing agent, water-soluble organic solvent, pH moderator, surfactant, and water. A compounding ratio for each of the materials contained in the pigment ink can be adjusted according to the image to be formed and reaction liquid to be used, for example the pigment may be 1 to 10 percent, the water-soluble organic solvent is 70 to 90 percent, and the other compound may be equal to or less than several percent.

The reaction liquid as the second liquid prevents an image formed by inks of the plurality of colors from mixing the color of the inks, and thus a high quality image is formed. And the pattern of the powder material 12 is already formed effected by the first liquid. The amount of the powder materials 6a is not affected by the amount of color ink as the second liquid.

There is another merit brought by forming colored powder pattern 13 by applying the first liquid, the powder material 6a and the second liquid in this order. For example, if applying the reaction liquid as the first liquid and successively applying the second liquid prior to the powder materials 6a, the reaction between first liquid and second liquid may have some effect on surface of the transfer member 1 and a formed layer may be hard to remove from transfer member 1. On the other hand, because the order in the present embodiment provides that the reaction between the first liquid and second liquid is effected at a side of the powder materials 6a, a transfer efficiency is good and also fixing between the layer of the second liquid and the powder materials 6a can be done well.

Furthermore, the order in the present embodiment has merit in that color development on a side surface of the structural body is natural because it is possible to add a color to the pattern of the powder material 12 such that coloration on a side surface of the colored powder pattern 13 has uniformity.

Next, the colored powder pattern 13 formed on the transfer member 1 is conveyed to a position where heating is performed by the heating device 7. At the position, the heating device 7 heats the colored powder pattern 13 by emitting a heat ray to let the colored powder pattern 13 become a film. A method for heating by the heating device 7 is not limited in particular. For example, heat rollers may contact the colored pattern, or the pattern may be irradiated with an infrared ray or micro wave without contacting to the colored pattern. Heating by scanning of the energy beam such as laser may be used. And also, the heating device 7 may be provided at back side of transfer member 1.

In addition, it is possible to form the film from the colored powder pattern 13 by photocoagulation when a compound in the colored powder pattern 13 comprises a photocoagulation ingredient. In this case, if the light is irradiated to the colored powder pattern 13 in a state where the colored powder pattern 13 contacts to a print medium or a structural body under construction, transferring of the film from the colored powder pattern 13 to the print medium or structural body under construction and adhesion of the film from the colored powder pattern to a print medium or structural body under construction can be done simultaneously.

The colored pattern 14 in the film state formed by making the colored powder pattern 13 film is transferred to a position opposite to a lamination unit 8, then fixed to the position of the lamination unit, and then contacted to an in-process structural body 10. When the colored pattern 14 and the in-process structural body 10 are attached each other, the colored pattern 14 is cooled by a cooling unit (not shown) to be attached to the in-process structural body 10. In this way a lamination of the colored pattern 14 is operated. It is also possible to put the colored pattern 14 formed by heating of the colored powder pattern 13 and cooled on the in-process structural body 10 by an adhesive agent. In this laminating process, a back plate provided on back side than the surface of the transfer member 1 may be used.

In addition, the powder materials 6a are melted to become a film in the present embodiment as described above on the transfer member 1. However, the colored powder pattern 13 can be transferred to the in-process structural body 10 or print medium before the colored powder pattern 13 is made to become a film. This way may give a strong adhesion between the formed film and the in-process structural body 10 or print medium for certain powder materials 6a and/or certain print media. And in this way, the second liquid applied to the pattern of the powder material 12 can give an upper surface of the applied powder materials 6a adhesiveness for attaching to the in-process structural body 10.

In addition, the colored powder pattern 13 in completed structural body or completed colored pattern can include powder materials that are not melted.

Furthermore, when forming a structural body having overhanging shape, a support member (not shown in FIG. 1) for temporarily supporting the overhanging shape of the in-process structural body 10 may be provided in the producing process of the structural body in the lamination unit 8. This support member may be formed according to a material used for the structural body and use of the structural body. For such a case lamination unit 8 may comprise a support material providing device (not shown) configured to provide a material for forming the support member to support position nearby the in-process structural body.

When the laminating operation described above is repeatedly performed, and lamination is performed a set number of times, the structural body is formed.

FIG. 4 is a block diagram showing a control system of the manufacturing apparatus 100 shown in FIG. 1. In the three-dimensional object forming apparatus entirely represented by reference numeral 100, reference numeral 101 indicates a CPU which functions as a major control portion of the entire system and controls individual units. Reference numeral 102 indicates a memory which is formed, for example, of ROMs storing a basic program of the CPU 101 and RAMs used to store a structural body data 104 as a print data inputted through an interface 103 and to perform data processing.

When the CPU 101 receives a signal indicating the start of shape formation, a process converting the structural body data into a slice data which is outputted in accordance with setting conditions is started. Then the CPU 101 sends data, of the slice data, on an area for applying the first liquid by the first inkjet device 3, and data, of the slice data, on an area for applying the second liquid by the second inkjet device 4. At the same time, communication is performed to confirm the states of the conveyance roller 2 as a transport mechanism, the first inkjet device 3, the second inkjet device 4, powder material applying device 6, heating device 7, the lamination unit 8, the support member providing device 15. When the states are ready to start the shape formation, the transfer member 1 is moved by the conveyance roller 2. When a position of the transfer member 1 is determined by signal ob encoder 105, the first inkjet device 3, the second inkjet device 4, water removal mechanism 5, powder material applying device 6, heating device 7, and the lamination unit 8 perform predetermined operations, and repeat the predetermined operation for the predetermined number of times to complete the structural body.

Hereinafter, an example of the present invention will be described.

EXAMPLE 1

As Example 1, manufacturing of a structural body was performed by laminate formation using the apparatus shown in FIG. 1.

First, the data of the structural body could be prepared as a slice data of each layer having a predetermined thickness, and in this example, a slice data of every 100 micrometer-thick layer was used.

As the transfer member 1, a PET film was used which had a thickness of 0.4 mm and which was coated with a 0.2 mm-thick silicone rubber (trade name: KE-1310, manufactured by Shin-Etsu Chemical Co., Ltd.) having a rubber hardness of 40 degrees. In order to suppress an ink from being repelled on the surface of the transfer member 1, the transfer member 1 was processed under the following conditions by a remote-type atmospheric pressure plasma treatment apparatus (trade name: APT-203 rev., manufactured by Sekisui Chemical Co., Ltd.) for surface modification.

Flow rate of gas type: 1,000 cc/m of air, 6,000 cc/min of $N_2$
Input voltage: 230 V
Frequency: 10 kHz
Treatment rate: 100 mm/min Next, in order to suppress an ink from spreading over the transfer member 1, a reaction liquid having the following compounds was applied using a nozzle of an ink jet head to a position corresponding to a cross-sectional pattern for forming the cross-sectional layer to be a part of the structural body.

[Compounds of Reaction Liquid]
$Ca(NO_3)_2 \cdot 4H_2O$: 50 parts by mass
Surfactant (trade name: Acetylanol EH, manufactured by Kawaken Fine Chemicals Co., Ltd.): 1 part by mass
Diethylene glycol: 9 parts by mass
Purified water: 40 parts by mass Next, polypropylene particles (average particle diameter: 200 micrometers) functioning as the powder material 6a was supplied to a pattern of the reaction liquid 11 on the transfer member 1 by a blade coater functioning as the powder material applying device 6.

Next, deelectrified air was blown from air gun (former pressure 0.25 Pa) to the transfer member 1, so that the powder materials 6a outside of the pattern of the reaction liquid 11 were removed. By this process, the pattern of the powder material 12 was formed.

Next, color inks having the following compounds were applied to the pattern of the powder material 12 for adding a color to the pattern of the powder material 12, and then the colored powder pattern 13 was formed.

[Ink Composition]
Following pigment: 3 parts by mass
Black: carbon black (trade name: MCF 88, manufactured by Mitsubishi Chemical Corp.),
Cyan: Pigment Blue 15,
Magenta: Pigment Red 7,
Yellow: Pigment Yellow 74
Styrene-acrylic acid-ethyl acrylate copolymer (acid value: 240, weight average molecular weight: 5,000): 1 part by mass
Glycerin: 10 parts by mass
Ethylene glycol: 5 parts by mass
Surfactant (trade name: ACETYLANOL EH, manufactured by Kawaken Fine Chemicals Co., Ltd.): 1 part by mass
Purified water: 80 parts by mass Next, heating was performed by a heater (not shown) from a side of the rear surface of the transfer member 1, and the colored powder pattern 13 was melted at approximately 170 degrees centigrade and was formed into a film, so that a layer of colored pattern 14 was formed.

Next, after the layer of colored pattern 14 was transported to the position of the lamination unit 8, and was placed at a predetermined position, the lamination unit 8 was upped to a position at which the gap to the surface of the transfer member 1 was 100 micrometers, so that the surface of a model forming table in the lamination unit 8 was brought into contact with the layer of colored pattern.

When the operation described above is repeatedly performed, and lamination was completed 1,000 times by laminating a new layer to a laminate previously formed, and a structural body having a height of 10 cm was formed.

The example of producing structural body by laminating layers from the colored pattern is described above, an example of invention for forming an electric line substrate as a print product is described below.

EXAMPLE 2

As Example 2, manufacturing of a print product was performed by apparatus similar to the apparatus shown in FIG. 1.

A pattern having the shape of a circuit (width of a line of the circuit is 0.5 mm) is formed by applying a reaction liquid having the following compounds from the first inkjet device 3 to a epoxy resin substrate of the electric board use (thickness 1 mm) replacing the transfer member 1 in FIG. 1.

[Compounds of Reaction Liquid]
$AlK(SO_4)_2/12H_2O$: 40 parts by mass
Styrene-acrylic acid-ethyl acrylate copolymer (acid value: 270, weight average molecular weight: 1,500):3 parts by mass
Surfactant (trade name: ACETYLANOL EH, manufactured by Kawaken Fine Chemicals Co., Ltd.): 1 part by mass
Diethylene glycol: 13 parts by mass
Purified water: 43 parts by mass Next, a formed pattern of the reaction liquid was dried by the warm air from a water removal mechanism 5 at 50 degrees for 3 minutes. Next, solder ball (particle diameter: 200 micrometers) was applied to the dried pattern of the reaction liquid 11, then the substrate was vibrated and the powder materials 6a outside of the pattern of the reaction liquid 11 was removed.

Next, color inks having the following compounds were applied to the pattern of the formed solder ball as described above for adding a color to the pattern of the solder ball, and then the colored solder ball pattern as the colored powder pattern 13 was formed. The color inks were applied to the pattern of the solder ball such that red and black color is added to a portion corresponding to line of 5V in design and blue and yellow color is added to a portion corresponding to line of 2.5V in design.

[Ink Composition]
Following pigment: 10 parts by mass
Black: $CuO.Cr_2O_3$
Blue: $CoO.Al_2O_3$
Red: $Cds.3CdSe$
Yellow: CdS
White: $TiO_2$(Rutile type)
Clear ink: no pigment
Styrene-acrylic acid-ethyl acrylate copolymer (acid value: 220, weight average molecular weight: 5,000): 2 part by mass
Ethanol: 4 parts by mass
Ethylene glycol: 4 parts by mass
Surfactant (trade name: ACETYLANOL EH, manufactured by Kawaken Fine Chemicals Co., Ltd.): 1 part by mass
Purified water: 79 parts by mass
Clear ink is containing the purified water 89 parts by mass.

Next, the substrate with the formed colored solder ball pattern was heated in a heating furnace at 220 degree for 5 minutes. The solder ball was melted so that the electric line substrate provided with electric lines distinguished by color was formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261519, filed Dec. 18, 2013, which is hereby incorporated by reference herein in its entirety.

What is claimed is:

1. A method of manufacturing a pattern comprising:
providing a pattern of a first liquid on a medium;
applying a powder material to the provided pattern; and
applying a second liquid to the powder material applied to the first liquid to form a colored pattern of the powder material,
wherein the second liquid is a color ink, and
wherein the first liquid is a reaction liquid which reacts with the color ink to provide a fixing effect to a color compound of the color ink.

2. The method of manufacturing a pattern according to claim 1, wherein applying the powder material comprises providing powder materials to an area of the medium including the pattern of the first liquid, and removing the powder materials outside of the pattern of the first liquid.

3. The method of manufacturing a pattern according to claim 1, further comprising transferring the formed colored pattern of the powder material to an in-process structural body.

4. The method of manufacturing a pattern according to claim 1, wherein applying the second liquid on the powder material comprises ejecting the second liquid by an inkjet device.

5. The method of manufacturing a pattern according to claim 1, wherein the powder material is thermoplastic resin, and wherein the method further comprises melting the colored pattern including the first liquid, the powder material and the second liquid.

6. The method of manufacturing a pattern according to claim 1, the first liquid has transparency.

7. The method of manufacturing a pattern according to claim 1, the second liquid is pigment ink and the first liquid comprises a metal salt.

8. The method of manufacturing a pattern according to claim 1, the second liquid comprises a plurality of inks having different colors.

9. A method of manufacturing a structural body comprising:
forming a layer on a transfer member by and operation including:
providing a pattern of a first liquid on the transfer member;
applying a powder material to the provided pattern; and
applying a second liquid to the powder material applied to the first liquid; and
transferring the formed layer to an in-process structural body,
wherein the second liquid is a color ink, and
wherein the first liquid is a reaction liquid which reacts with the color ink to provide a fixing effect to a color compound of the color ink.

10. The method of manufacturing a structural body according to claim 9, wherein the in-process body comprises a plurality of layers formed by the operation.

11. The method of manufacturing a pattern according to claim 10, wherein applying the powder material comprises providing powder materials to an area of the medium including the pattern of the first liquid, and removing the powder materials outside of the pattern of the first liquid.

12. The method of manufacturing a pattern according to claim 10, wherein applying the second liquid on the powder material comprises ejecting the second liquid by an inkjet device.

* * * * *